United States Patent [19]

Osaki

[11] Patent Number: 5,657,449
[45] Date of Patent: Aug. 12, 1997

[54] EXCHANGE CONTROL SYSTEM USING A MULTIPROCESSOR FOR SETTING A LINE IN RESPONSE TO LINE SETTING DATA

[75] Inventor: Yoshiro Osaki, Tokyo, Japan

[73] Assignee: Kabushiki Kaisha Toshiba, Kawasaki, Japan

[21] Appl. No.: 415,748

[22] Filed: Apr. 3, 1995

Related U.S. Application Data

[63] Continuation of Ser. No. 310,367, Sep. 22, 1994, abandoned, which is a continuation of Ser. No. 744,449, Aug. 13, 1991, abandoned.

[30] Foreign Application Priority Data

Aug. 20, 1990 [JP] Japan ................................. 2-218764

[51] Int. Cl.$^6$ ........................... G06F 15/163; G06F 17/00
[52] U.S. Cl. .......................... 370/357; 395/311; 370/360
[58] Field of Search ........................... 395/200, 650, 395/200.08, 200.19, 858, 851, 853, 311; 379/268–273, 280

[56] References Cited

U.S. PATENT DOCUMENTS

| | | | |
|---|---|---|---|
| 4,495,570 | 1/1985 | Kitajima et al. | 395/650 |
| 4,511,762 | 4/1985 | Stockdale | 179/9 |
| 4,604,690 | 8/1986 | Crabtree et al. | 395/700 |
| 4,611,322 | 9/1986 | Larson et al. | 370/6 |
| 4,670,899 | 6/1987 | Brody et al. | 379/60 |
| 4,737,983 | 4/1988 | Frauenthal et al. | 379/221 |
| 4,827,499 | 5/1989 | Warty et al. | 379/58 |
| 4,974,256 | 11/1990 | Cyr et al. | 379/113 |

*Primary Examiner*—Thomas G. Black
*Assistant Examiner*—Jean R. Homere
*Attorney, Agent, or Firm*—Finnegan, Henderson, Farabow, Garrett & Dunner, L.L.P.

[57] ABSTRACT

An exchange system which comprises a plurality of line setting processors and a line-setting-signal path management processor for connecting the line setting signal paths of lines to the plurality of line setting processors. Each of the line setting processors judges whether or not the associated line is activated. When a line setting processor determines that the line is activated, it informs the line-setting-signal path management processor of this fact. The line-setting-signal path management processor determines, on the basis of the loads of the line setting processors, a suitable one of the line setting processors to be connected to the line setting signal paths of the activated line, and connects the suitable line setting processor to the line setting signal paths. Communication of necessary data is carried out between the line-setting-signal path management processor and the plurality of line setting processors so that even when a new line setting processor is added in the system, a maintenance operator can avoid complicated load estimation.

14 Claims, 11 Drawing Sheets

EXCHANGE CONTROL SYSTEM USING A MULTIPROCESSOR FOR SETTING A LINE IN RESPONSE TO LINE SETTING DATA

This application is a continuation, of application Ser. No. 08/310,367 filed Sep. 22, 1994 now abandoned, which is a continuation application of Ser. No. 07/744,449, filed Aug. 13, 1991, now abandoned.

BACKGROUND OF THE INVENTION

1. Field of the Invention

The present invention relates to an exchange control system using a multi-processor.

2. Description of the Related Art

FIG. 13 is a block diagram illustrating an arrangement of a conventional exchange system including a control system. The conventional exchange system includes terminals 1-1 to 1-m which are connected through line interfaces 2-1 to 2-m to a main switch 3. Also included in the exchange system are trunk lines 5-1 to 5-p which are connected through line interfaces 4-1 to 4-p to the main switch 3. For the control of the terminals, the line interfaces 2-1 to 2-m-2 are connected to a main processor 11 through a bus 6, a sub-processor 7 and a bus 10, while the line interfaces 2-m-1 and 2-m as well as the line interfaces 4-1 to 4-p are connected to the main processor 11 through a bus 8, a sub-processor 9 and the bus 10.

Such a conventional exchange system is arranged so that the processors for setting the lines are previously fixedly determined. That is, line setting-signals input from the respective lines are fixedly transmitted to subprocessors 7 and 9 through the buses 6 and 8 respectively.

Accordingly, when the loads of the respective lines are unbalanced, it was necessary to previously allocate the sub-processors 7 and 9 according to the unbalanced loads.

Further, when the number of lines is increased, it was necessary for a manager of the system to know a subprocessor having an extra capacity and to physically change the system configuration in such a manner that the line setting signal is directed to the extra-capacity sub-processor. This means that the physical positions of the lines could not be freely determined but the positions of the connectable lines were determined by the situations of the processor.

For this reason, the conventional exchange system had the following problems in the case where each user terminal such as a telephone set is fixedly connected to the respective line, a load imposed on the processor caused by setting lines is determined by the number of lines. Accordingly, even when there is the above-described physical restriction in the system, there may be a possibility that the line load is balanced with the physical restriction to some extent. However, in the case where the lines are connected with branch type terminals such as a private branch exchange (PBX), the physical number of lines becomes unbalanced with the line setting load imposed on the lines. As a result, when there is such physical restriction to the processor, it becomes impossible to efficiently form exchange systems.

With the recent technological innovation in optical fiber or the like, the band width of lines has been greatly expanded and a single wide-band physical line is frequently being used as a plurality of physical lines based on time multiplexing or statistical multiplexing. As a result, it is expected that the unbalance between the number of the physical lines and the line setting load becomes a big problem.

In particular, when an asynchronous transmission mode (ATM) system, which has been recently developed by CCITT, an international standard organization, is employed, a transmission line of wide-band communication is logically multiplexed based on statistical multiplexing so that the band to be used for each logical line can be flexibly set. For this reason, it is virtually impossible to predict to what extent line setting signals are generated in the physical line. Accordingly, in the aforementioned system which fixedly allocates the line to the processor, it is difficult to properly allocate the processor processing resource.

Further, the exchange system having such arrangements, wherein data in the system are always controlled centrally by a single central processor, has another problem. That is, under the current situations in which the line setting load is increasing, the load imposed on the central processor becomes very high, thus requiring the processor to have a very high ability.

As has been explained in the foregoing, the control system of the conventional exchange system has been defective in that, since loads to be imposed on the line processor are previously set and used, when it is desired to expand or reduce the system, the system maintenance operator must consider the physical positions of the lines and therefore the physical position of a line to be physically connected (added) is restricted depending on the system applications.

In addition, that the bandwidth of the physical lines will become wider in the future and each of the lines will be flexibly used as logically multiplexed based on statistical multiplexing. Since loads cannot be restricted corresponding to the respective lines, the conventional structure for physically allocating the processing resources has a problem that a processor having a very high ability must be prepared for each line, thus resulting in an expensive system.

SUMMARY OF THE INVENTION

It is therefore an object of the present invention to provide an exchange control system using a multi-processor capable of eliminating the above problems in the conventional system and even when line setting loads for lines are unbalanced, capable of uniformly dispersing such loads to line setting processors provided in the system.

In other words, an object of the present invention is to provide an exchange control system in which a plurality of processors corresponding in number to the scale of the system are prepared to control the entire system.

Another object of the present invention is to provide an exchange control system capable of eliminating the need for a maintenance operator to consider the dispersion of line setting loads for the physical lines of the system even when it is desired to increase or decrease the scale of the system.

In accordance with an aspect of the present invention, the above objects are attained by providing an exchange control system which has the following arrangement. That is, the exchange control system comprises a plurality of line setting processors, a line-setting-signal path management processor for connecting a line setting signal path of each line to the plurality of line setting processors, a plurality of line interfaces corresponding in number to the lines for judging whether the associated line is activated or inactivated and when determining that the line is activated, for informing the line-setting-signal path management processor of the effect, a main switch, and an inter-processor switch. The line-setting-signal path management processor decides, on the basis of the loads of the line setting processors, one of these setting processors to be connected to the line setting signal path of the activated line. The main switch acts, on the decision of the line-setting-signal path management processor, to connect the line setting signal path to the decided line setting processor. The inter-processor switch is used to perform exchange of control data between the respective processors (the plurality of line setting processors and the line-setting-signal path management processor) to attain communication of data necessary between the line-setting-signal path management processor and the other line setting processors via the main switch. As a result, even in the event where it is desired to add a new line setting processor in the system, a maintenance operator can avoid the need for the complicated load estimation of the system.

In the present invention, the line setting processors are not fixedly provided for the respective physical lines but when a line is activated, a processor for setting the line is selected from the plurality of processors on the basis of the loads of these processors. Accordingly, unlike the conventional exchange system wherein processors are fixedly allocated to the respective physical lines so that the load of one processor is computed from the physical position connected to the associated line to limitedly use the decided line, the exchange system of the present invention can be flexibly formed.

Further, even in the case where it is desired to add a new line in the exchange system, the system maintenance operator can avoid the need for the estimation of the loads imposed on the processors and a terminal can be freely connected to idle one of the line interfaces to activate the line.

In addition, even in the case where it is desired to use the present invention as a wide-band communication exchange system using, e.g., the ATM system wherein each physical line is used as multiplexed and even when used as a plurality of logical lines, a processor can be freely allocated not according to the physical connection position of the line but according to the line setting load of the line.

Therefore, in accordance with the present invention, there can be provided an efficient and low-cost exchange system which requires a minimum number of processors optimum for the scale of the system application.

Further, in accordance with the present invention, there is provided an exchange system which allows addition of necessary resources and thus system expansion according to its ability while eliminating the need for modifying the basic arrangement of the entire system or stopping the system.

An feature of the present invention is that, a plurality of line setting processors are provided and when a line is activated, one of the processors for the setting of the line is allocated, so that, even when one line is logically multiplexed to provide a plurality of line setting operations therefor, the system maintenance operator can eliminate the need for the estimation of setting load of the line and the need for taking the processing resource for processing the load into consideration and the respective processing resources can be uniformly and wastelessly used. Thus, there can be advantageously provided a low cost system wherein a minimum number of processors optimum for the scale of the system application are provided in its center part (not in association with the respective physical lines).

In this way, since lines are arranged in dynamic or logical relationship with processors for processing the lines, there can be provided an exchange control system which, when it is desired to expand the scale of the system, allows addition of a processor while eliminating the need for stopping the system.

DESCRIPTION OF THE PREFERRED EMBODIMENTS

An embodiment of the present invention will be explained with reference to FIGS. 1 to 12. The present invention is effective, in particular, in such a system that line setting loads for lines vary largely, that is, that physical lines have wide-band capacities and are used as a plurality of logical lines on statistical multiplexing basis. Explanation will be made in the following as to the embodiment which employs an ATM transmission/exchange system being studied by the international standard organization CCITT. However, it will be easily appreciated that the present invention is not limited, in particular, to the above system using the ATM and may be applied to systems similar to the above system.

Figure 1:
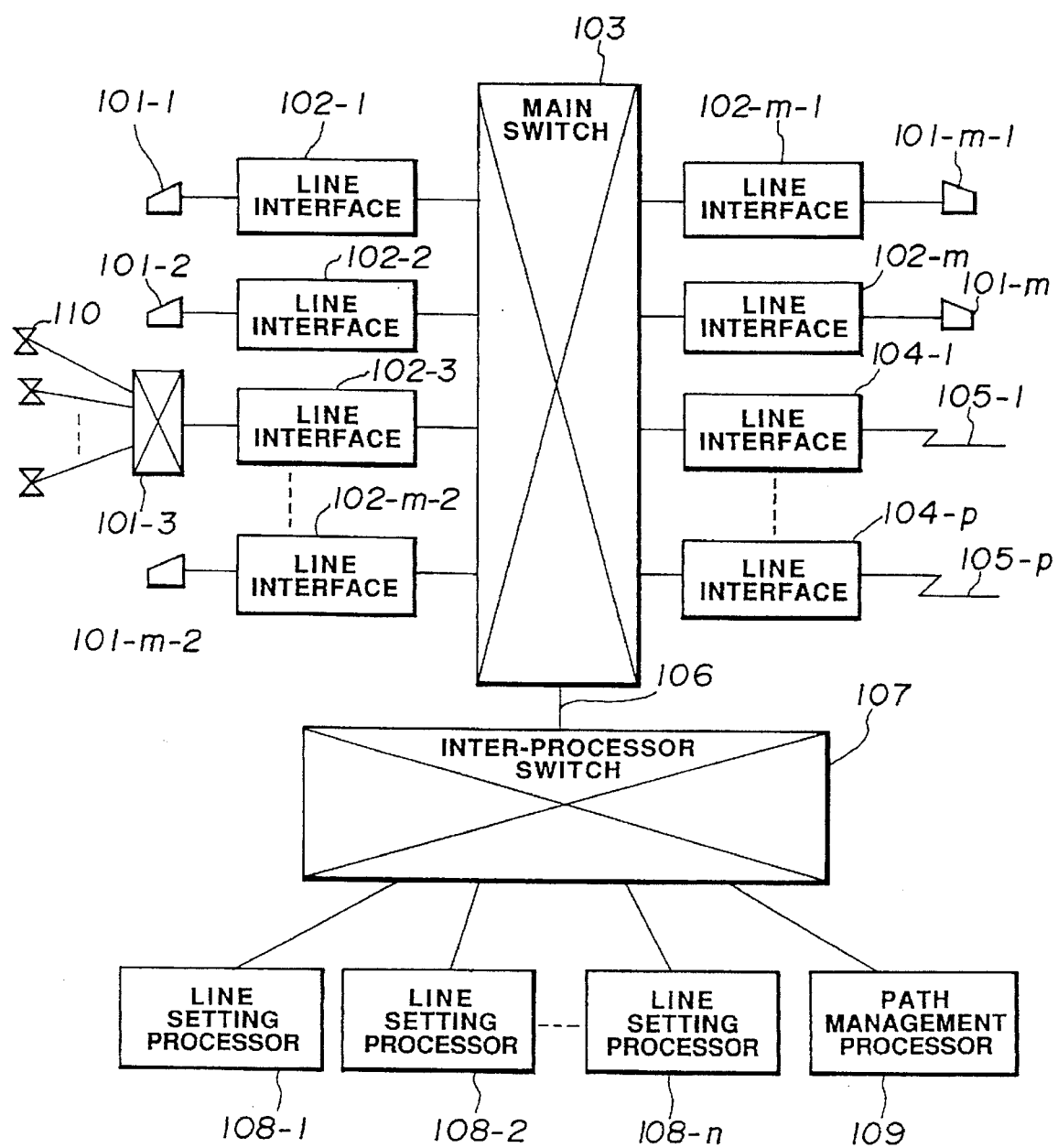
FIG. 1 is a block diagram of an exchange control system in accordance with an embodiment of the present invention.

Referring first to FIG. 1, there is shown a block diagram showing the entire arrangement of an exchange system to which the present invention is appllied. The exchange system includes m terminals 101-1 to 101-m which are connected through line interfaces 102-1 to 102-m to a main switch 103 respectively. Also connected to the main switch 103 are p trunk lines 105-1 to 105-p through line interfaces 104-1 to 104-p respectively.

Since the exchange system of the present embodiment, as has been explained above, is assumed to be based on the ATM system, data issued from the terminals 101-1 to 101-m are all short packets called cells. A physical transmission line forms a plurality of logical channels for the short packets having different addresses changed in their header parts.

The terminals 101-1 to 101-m may include not only such terminals usually now being used as telephone sets but also such terminals as to allow simultaneous use of telephone and facsimile functions or such terminals allowing simultaneous connection of voice and video signals as television telephones. The terminals 101-1 to 101-m may also include such terminals as to have telephone, facsimile and data terminal functions combinedly and to allow simultaneous use of all of these functions or use of only desired one or ones thereof as necessary or according to user's preference. The terminals 101-1 to 101-m may further include such a terminals as a PBX terminal 101-3. In this case, when a line setting signal is issued from each telephone terminal 110 connected to the PBX terminal 101-3, the exchange system performs its line setting operation for each telephone terminal 110.

In this way, in the exchange system of the present invention, the frequency of line setting operation occurring for one physical line is not always limited to one. In other words, the number of lines does not always coincide with the number of line setting loads.

The main switch 103 perform interconnections between the terminals 101-1 to 101-m as well as between the terminals 101-1 to 101-m and the trunk lines 105-1 to 105-p to realize a desired point-to-point communication. In the present embodiment using the ATM system, the point-to-point communication is realized not by means of an external single control signal set as by a time switch but by means of a table set for conversion of cell headers on incoming/ outgoing line interfaces, that is, by means of two-action processing.

The trunk lines 105-1 to 105-p, as mentioned above, are used also as multiplexed on the ATM basis. In other words, communication signals having various bands flow through each of the trunk lines 105-1 to 105-p. It is possible in some cases to set the signals to have a relatively small number of large-area communications and in some cases to set the signals to have a large number of small-area communications (as in the current voice communication or data communication). For this reason, the number of line setting requests issued from the adjacent exchange system through the line does not always coincide with the capacity of the line.

The main switch 103 is connected through a line 106 with a inter-processor switch 107 which in turn is connected with n line setting processors 108-1 and 108-n as well as a line-setting-signal bath management processor 109.

A signal indicative of a line setting data for each line is issued from associated one of the terminals 101-1 to 101-m and arrives at associated one of the line interfaces 102-1 to 102-m through lines connected therebetween. The associated one of the line interfaces 102-1 to 102-m, when receiving the signal form the associated terminal, attached, to the received signal, a preset routing data (routing tag) necessary for the main switch 103 in association with the logical channel through which the signal is transmitted. The routing data is previously set, when the associated line is activated, as a result of data exchange between the main switch 103 and the line-setting-signal path management processor 109. The signal attached with the routing data is further sent through the main switch 103 and the line 106 to associated one of the line setting processors 108-1 to 108-n.

Explanation will now be made as to how to previously set the above routing tag data. The line-setting-signal path management processor 109, when the system is started and the associated line is activated, selects one of the plurality of line setting processors 108-1 to 108-n suitable from the viewpoint of loads. At this time, the line-setting-signal path management processor 109 has a function, on the basis of the data transmitted from the associated one of the line interfaces 102-1 to 102-m, of causing a line setting signal path of the line connected with the associated line interface to be connected to the selected line setting processor 108. The detailed processing for this interconnection include setting of the routine tag table in associated one of the line interfaces 102-1 to 102-m and setting of user data in associated one of the line setting processors 108-1 to 1-8-n.

The inter-processor switch 107 allows exchange of necessary data between desired ones of the processors 108-1 to 108-n and 109. Data to be exchanged between the processors 108-1 to 108-n and 109 are roughly classified into three data, that is, a line setting signal at the time of setting a line between the line setting processors 108-1 to 108-n, a control signal for interconnection between the line setting signal path and the associated one of the line setting processors 108-1 to 108-n when the system is initially started or when a line is newly activated, and finally a data to be exchanged between the inter-processor switch 107 and the line-setting-signal path management processor 109 so as to provide a normal operation when a line setting processor is newly added.

Each of the line setting processors 108-1 to 108-n analyzes the line setting data received through the line setting signal path set in such a manner as mentioned above and actually carries out its line setting operations. The line setting operations include the following (1) to (3).

(1) Setting of the main switch (actually, setting of the routing tag table in the associated line interface).

(2) Managing of operational circumstances of the corresponding line.

(3) Determining of the corresponding line setting processor to be connected.

Figure 2:
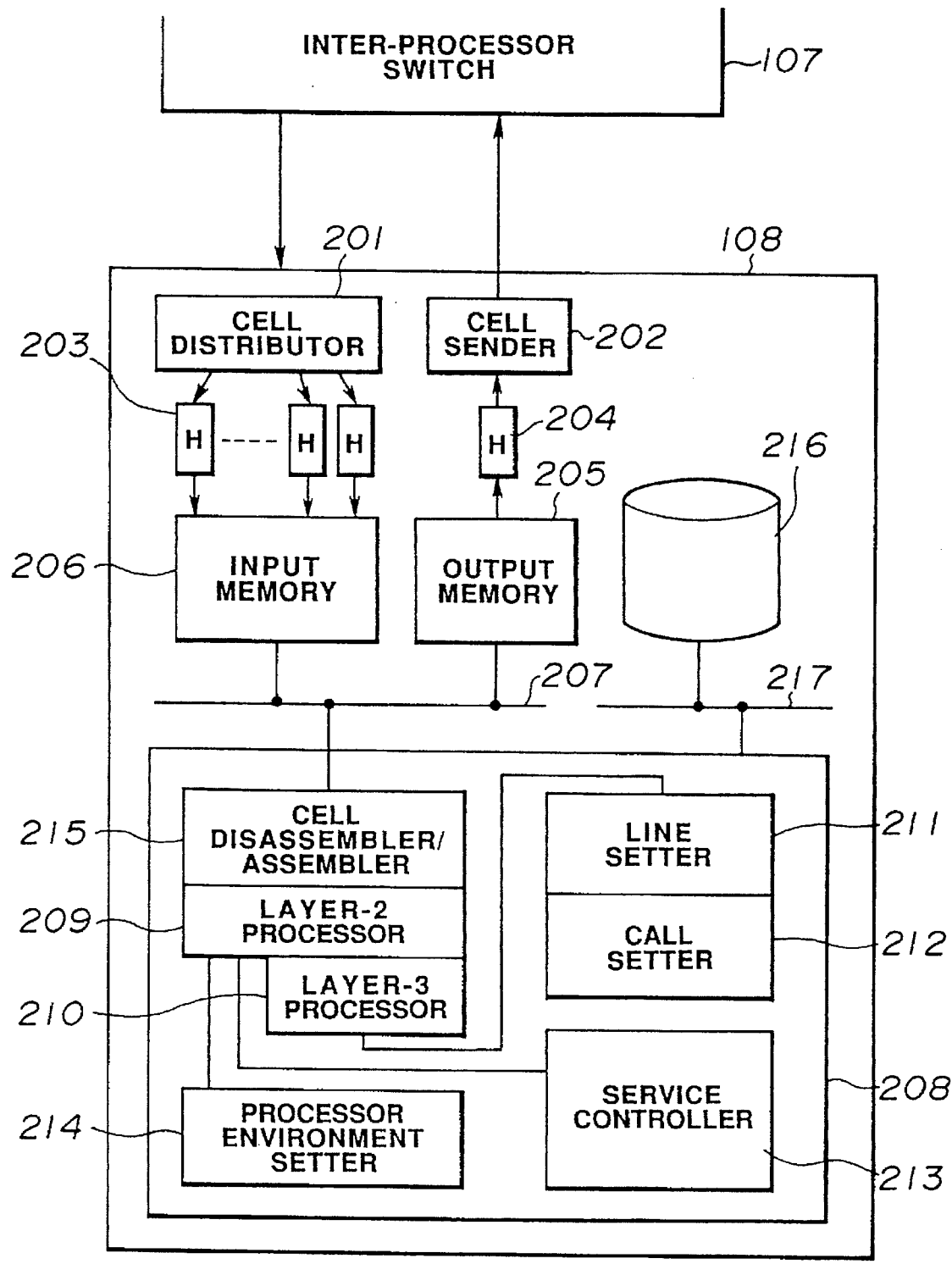
FIG. 2 is a block diagram showing an exemplary arrangement of a line setting processor used in the system.

Shown in FIG. 2 is an interior structure of each of the line setting processors 108-1 to 108-n (which is represented as the typical line setting processor 108 in the drawing). A line setting signal having a cell format is transmitted from one of the terminals 101-1 to 101-m through the main switch 103 and the inter-processor switch 107 to the line setting processor 108. The line setting signal received as cells into line setting processor 108 is first applied to a cell distributor 201 and further distributed therefrom to a plurality of cell handlers 203 prepared for high-speed processing. This distribution is carried out on the basis of the VCI values of the cells in their header parts.

The cell data are further sent from the cell handlers 203 to an input memory 206 to be spread thereon, sent through a control bus 207 to a cell disassembler/assembler to be processed thereat, and then sent to a layer-2 processor 209 in a frame manner to be subjected thereat to an error control processing corresponding to an HDLC protocol. The frame data, when determined that the frame has no error, is sent to a layer-3 processor higher in layer than the layer-2 processor 209.

The layer-3 processor 210 analyzes data in the received frame and issues or displays an operation request for a call processor as its upper processor. As examples of the protocol of the layer 2 and layer 3, Q.921 and Q.931 recommended by the CCITT organization are enumerated. Further, and protocol substantially the same as the above may also be employed. In this connection, it is necessary to carry out the line setting processing by diverging it into two processing parts.

A line setter 211 and a call setter 212 perform call processing operations. In the present embodiment, the line setter 211 performs the operation associated with the setting of a line channel, while the call setter 212 performs the operation associated with the management of user's communication mode (which is referred to as the call, herein) of the line to be connected. That is, the call setting operation is separately carried out.

A service controller 213 performs additional service other than the basic interconnecting operation. The service, in the present embodiment, also includes such service as necessary for data exchange between the service controller 213 and another processor, in which case such data is exchanged through the aforementioned inter-processor switch 107.

A result analyzed in a main processor 208 is sent again through the layer-3 processor 210 and the layer-2 processor 209 and further through the control bus 207, an output memory 205, a cell send handler 204 and a cell sender 202 to the inter-processor switch 107. More in detail, the output memory 205 temporarily stores therein a data to be sent, the cell send handler 204 has a function of sending data on the output memory 205 to the cell sender 202 on every cell-data basis, and the cell sender 202 has a function of sending a cell received from the cell send handler 204 to the inter-processor switch 107.

A processor environment setter 214, when line setting operations are allocated, functions to set a processor environments necessary for accepting a subscriber's data corresponding to the corresponding line from the line-setting-signal path management processor 109 or accepting positional data of lines under control of the other line setting processors. At this time, the data exchange is carried out through the aforementioned inter-processor switch 107. However, since it is also expected that the exchange data is too much, the data exchange is carried out through the layer-2 processor 209 as shown in FIG. 2.

A local database 216, which is connected through a control bus 217 to the main processor 208, is provided to store therein local data necessary for control of the call setting processor 108.

Figure 3:
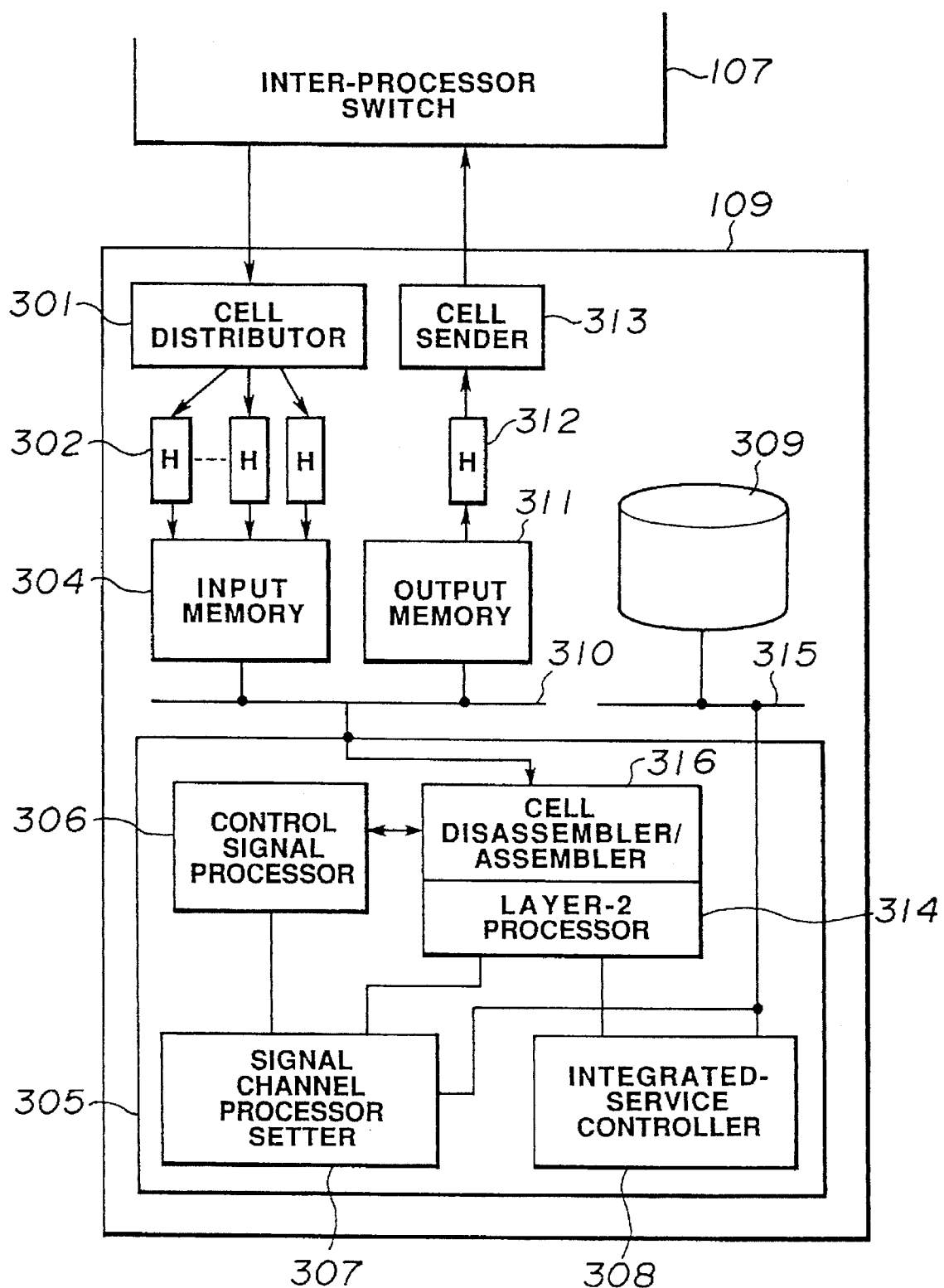
FIG. 3 is a block diagram showing a line-setting-signal path management processor used in the system.

FIG. 3 shows a structure of the line-setting-signal path management processor. A cell distributor 301 has substantially the same structure as the cell distributor 201 in FIG. 2. Further, each of cell handlers 302 has substantially the same function as each of the cell handlers 202 in FIG. 2 and an input memory 304 has substantially the same function as the input memory 204 in FIG. 2.

As in the case of FIG. 2, a cell received from the inter-processor switch 107 is sent to the input memory 304 to be spread and processed thereon and then sent through a control bus 310 to a main processor 305 to be processed at the timing corresponding to the ability of a main processor 305. In the main processor 305, a cell disassembler/assembler 316 first checks the header of the received cell to judge whether or not the cell is a control cell indicative of one of the line activation of the line interfaces 102-1 to 102-m. The cell disassembler/assembler 316, when determining that the received cell is a control cell for line setting, sends the received cell to a control signal processor 306 where the line interface identifier in the cell is examined. And the control signal processor 306 seizes the usable one of the logical channels of the line as the line setting signal path of the line.

The number of the seized channel is sent, as a response cell for the setting of the line-setting-signal path, through the control bus 310, an output memory 311, a cell send handler 312 and a cell sender 313 to a corresponding one of the line interfaces 102-1 to 102-m as the caller. In the present embodiment, for the purpose of making the structure of the line interfaces 102-1 to 102-m as compact as possible and lowering the cost, the amount of exchange data with the line interfaces 102-1 to 102-m is minimized and such a communication configuration as to only require a simple communication method at the time of data exchange is employed.

At the same time, a line-setting-signal processor setting processor 307, according to a request from the control signal processor 306, determines one of the processors to be set for the line. In the determination, of the call setting processors already performing the other line setting operations, one suitable from the viewpoint of the load is selected. When the suitable call setting processor is determined, subscriber's data corresponding to the line is loaded from a database 309 into the line-setting-signal processor setting processor 307.

The data loaded from the database 314 is transmitted to the above selected line setting processor through a layer-2 processor 314, the control bus 310, the output memory 311, the cell send handler 312 and the cell sender 313.

An integrated-service controller 308 performs data exchange with the service controller 213 of an associated one of the line setting processors 108-1 to 108-n and performs integrated management of that service data of services other than the basic interconnection service which is unserviceable only with the local data of the line setting processor. For example, the integrated-service controller 308 concentratedly performs the management and updating of the routing data of the respective lines and when the routing data is changed, broadcasts the change data to all the line setting processors. In the event where an incoming-side line is not uniquely determined on the basis of the destination address data in the line setting procedure of the line setting processor and thus one of the line setting processors to be connected to the incoming-side-line-setting-signal path cannot be determined, the integrated-service controller 308, when receiving an inquiry from the line setting processor, informs the inquirer line setting processor of a data for determining one of the line setting processors to be connected to the incoming-side-line-setting-signal path based on the routing data of the respective lines.

The above data exchange is, as already explained above, carried out through the inter-processor switch 107.

Figure 4:
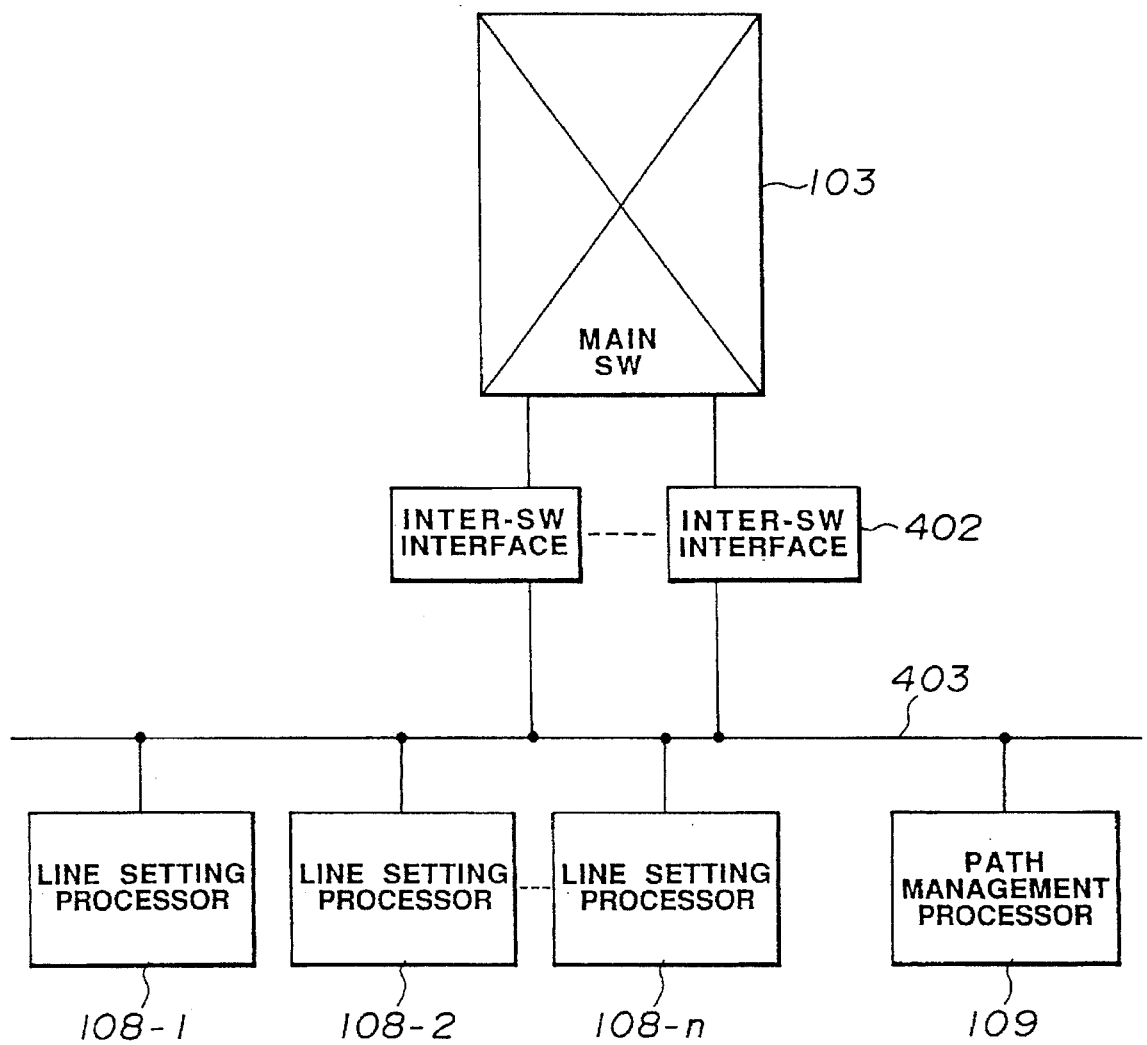
FIG. 4 is a block diagram showing an exemplary arrangement of an inter-processor switch used in the system.

Referring to FIG. 4, there is shown an exemplary detailed arrangement of the inter-processor switch 107, which is of a bus medium type using a switch bus 403 with bus type media. More specifically, the switch bus 403 is connected with the plurality of line setting processors 108-1 to 108-n and the line-setting-signal path management processor 109, thus enabling the data exchange between the respective processors. The main switch 103 connected to the lines is connected through one or more inter-switch interfaces 402 to the switch bus 403.

For the purpose of handling line setting signals from the plurality of lines, a high-speed switch bus capable of performing an exchanging operation on the cell basis is employed as the switch bus 503. The main switch 103 performs its exchanging operation on cell basis therein as already explained above and the inter-switch interface 402 performs its simple interfacing operation. For this reason, the bus is structured to perform its operation on the cell basis. This is for the purpose of avoiding the array of physical devices from coinciding with the array of the system processing ability, which is realized by performing signal processing within the line setting processors 108-1 to 108-n. With such an arrangement, the allocation of the processing ability concerning the line setting signals of the system can be fully logically realized.

Figure 5:
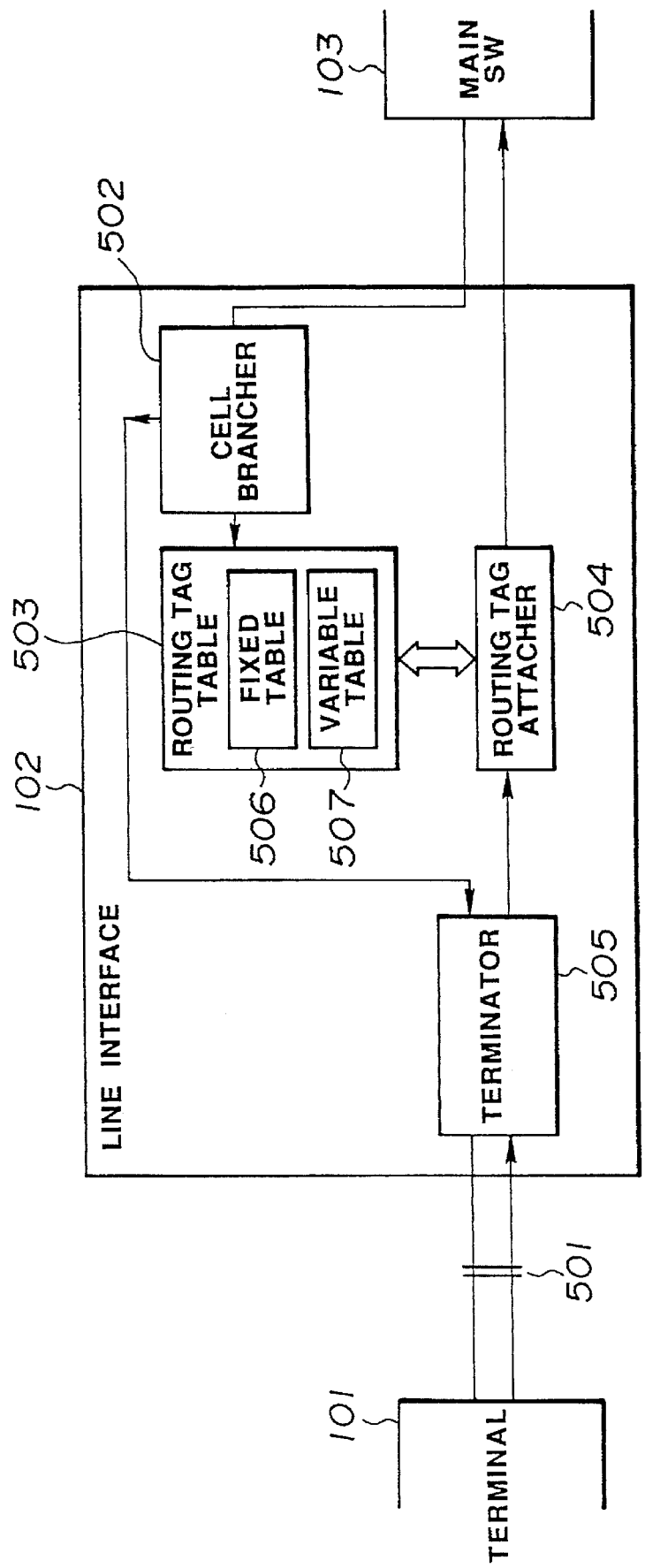
FIG. 5 is a block diagram showing an exemplary arrangement of a line interface used in the system.

Shown in FIG. 5 is a detailed structure of the line interface 102 which is made very simple in structure for the purpose of, as mentioned above, centralizing the processing of the line setting signals and realizing the allocation of the processing ability in the full logical form.

A line leading to the terminal 101 is connected to a terminating part 505 of the line interface 102. Since the terminator 505 performs only such lower-layer processing operation as synchronization, cell data are substantially all passed through the terminator 505. A routing tag attacher 504 acts to attach a data (called a routing tag) necessary for the route selection within the switch to the input cell. A routing tag table 503 is used to attach the routing tag to the input cell. According to the routing tag attaching procedure, the routing tag attacher 504 analyzes the logical channel of the input cell shown in its header, extracts the corresponding routing tag from the routing tag table 503 and attaches it to the cell.

The routing tag table 503 includes a fixed table 506 for determining the routing tag fixedly based on a certain logical channel and a variable table 507 for setting therein relationships between dynamic logical channels and the values of the routing tag in the line setting operation. In more detail, in the fixed table 506, such a logical channel (meta-signalling channel) as to demand a line setting signal path from the terminal is taken into consideration. In the illustrated example; the routing tag is set so that, when meta-signalling signal is received from the line, the cell is transmitted fixedly to the line-setting-signal path management processor 109 as an allocation request signal of the line setting processor. The variable table 507, which is set by the channel setting cell from the line setting processors 108-1 to 108-n after setting of the line setting signal path, shows a correlative relationship between the logical channel to be released at the time of completion of the speech and the routing tag.

A cell brancher 502 receiving a cell from the main switch 103, functions to judge on the basis of the routing tag value of the received cell whether the cell is to be actually directed to the line as user's data cell or is a control cell for the exchange system for its suitable distribution.

The control signals are two signals, that is, the signal for specifying the correlative relationship between the signal logical channel and routing tag from the line-setting-signal path management processor 109 and the signal for specifying the correlative relationship between the logical channel and routing tag for transmission of the user data from the line setting processors.

Figure 6:
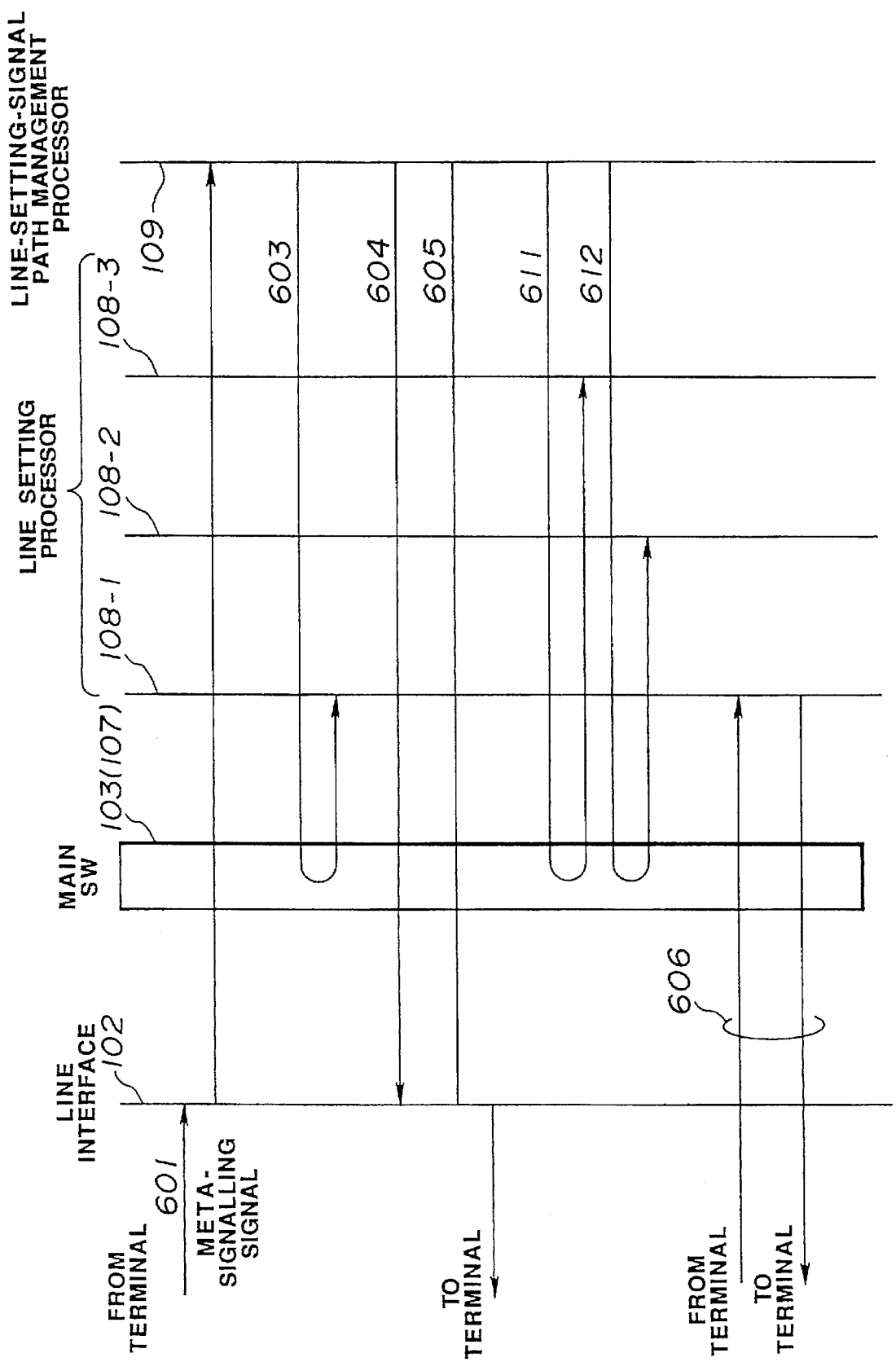
FIG. 6 is a sequence diagram for explaining how to allocate a line setting signal path and a corresponding processor.

FIG. 6 is a sequence diagram showing how the line setting signal path is set and the line setting processors are allocated when the line is activated (when a meta-signalling signal is received from the line in the illustrated example). More specifically, a meta-signalling signal 601 demanding the setting of the line setting signal path is first transmitted from the terminal to the line interface 102. The line interface 102, when receiving the meta-signalling signal 601, attaches to the received signal a routing tag to be directed to the line-setting-signal path management processor 109. At this time, the data of the routing tag contains a data indicative of the line-setting-signal path management processor 109 as its destination and an identifier indicating that the cell is a within-system control signal. Further, a value for identifying the line is inserted in the logical channel indicator part of the cell. The signal is transmitted through the main switch 103 and the inter-processor switch 107 to the line-setting-signal path management processor 109. The line-setting-signal path management processor 109, when receiving the signal, examines the control signal identifier and logical channel indicator of the received cell and when identifying to be a request for the setting of the line setting signal path from the line interface 102, carries out the following processing (1) to (5).

(1) Selection of one of the line setting processors having a remaining extra capacity.

(2) Selection of idle ones of the channels within the decided line setting processor.

(3) Selection of one of the idle channels usable within the line.

(4) Loading of subscriber's data corresponding to the line from the database.

(5) Generation of a modification data of the processor belonging to the subscriber to be informed to the processor and the other processors.

Subsequently, the line-setting-signal path management processor 109 transmits a signal 603 (including the signal reception channel data from the line and the routing tag data for transmission of the line setting signals to the signal channel of the line in the illustrated example) to the determination processor by which the processing of the line is determined to be processed. The line-setting-signal path management processor 109 also transmits a within-system control signal 604 (including the signal channel data to be used in the line and the routing tag data for transmission of the data to the line setting processor determined according to the signal channel) to the interface corresponding to the line. This signal 604 is set in the aforementioned variable table in the line interface 102. The line-setting-signal path management processor 109 further transmits to the terminal a signal 605 informing the terminal of the fact that the signal channel demanded by the meta-signalling signal has been set.

In the case where the line-setting-signal path management processor 109 receives an incoming signal for the lines belonging to the line setting processors 108-3 and 108-3, the processor 109 transmits modification data signals 611 and 612 to the line setting processors 108-3 and 108-2 for modification of the line belonging processors.

Meanwhile, signals 606 are used to initialize the layer 2 in order that, after cell level connection has been set between the terminal connected to the line and the line setting processor in the aforementioned processing, layer-2 level linking is set. Through the above operation, the logical path is set between the terminal and the line setting processor. Thereafter, signals concerning the line setting are received in the determined processor.

Figure 7:
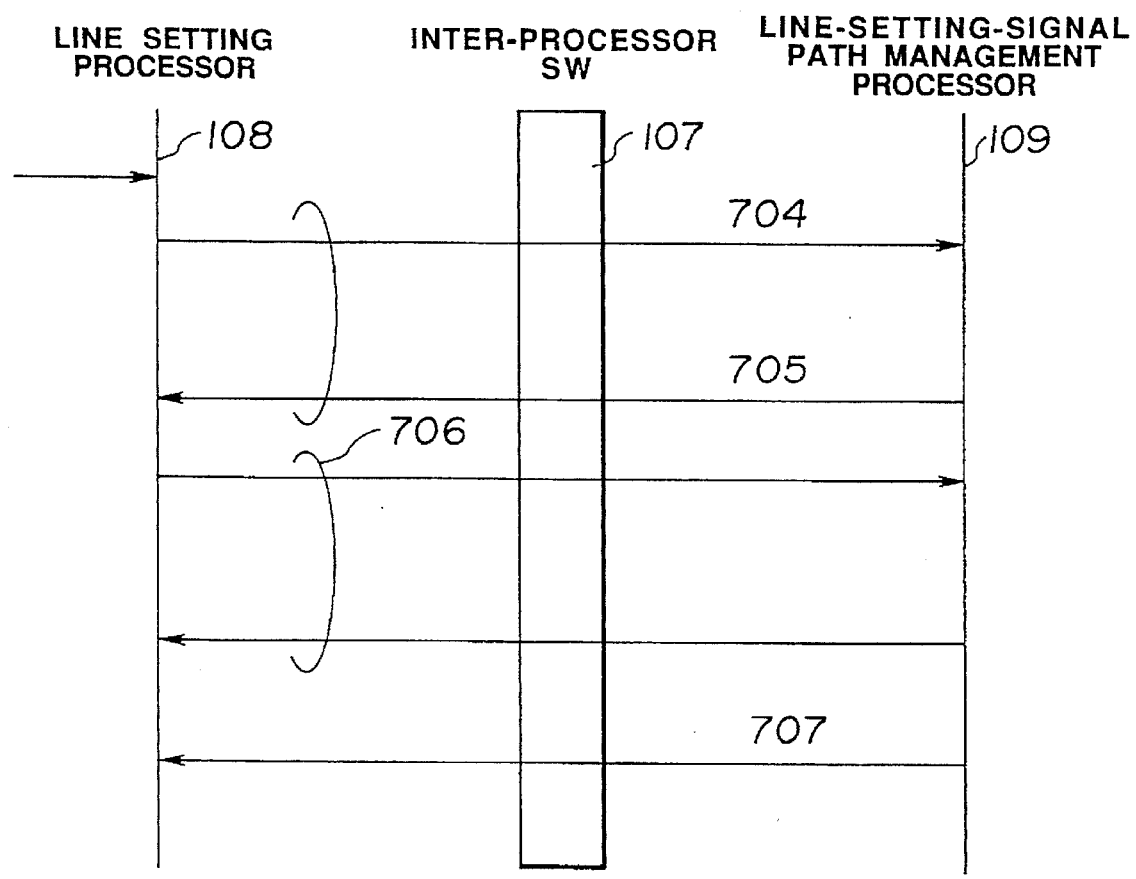
FIG. 7 is a sequence diagram for explaining a procedure of setting a signal link between the line setting processor and the line-setting-signal path management processor.

FIG. 7 is a diagram for explaining a sequence of setting a path to be used when the signals 603, 611 and 612 are transmitted, that is, a data path between the line-setting-signal path management processor 109 and the line setting processor 108. More concretely, when a signal first causes the line setting processor 108 to be connected to the system, the line setting processor 108 transmits a cell 704 for demanding a connection through the inter-processor data switch 107 to the line-setting-signal path management processor 109. The line-setting-signal path management processor 109, when receiving the cell 704, sends a response cell 705 back to the line setting processor 108. At this time, as the routing tag, a data previously fixedly set in the processor is used. Next, initialization of the layer 2 is carried out and a path is set between the processors, as shown by 706. At this stage, the path setting is completed. The line-setting-signal path management processor 109 transmits, as the initial data for the line setting of the line setting processor, the list and its positional data of line processing processors already being used other than the line setting processor 108, the data of lines belonging to these line setting processors, and address analysis data, in the form of a signal 707 to the line setting processor 108.

Figure 8:
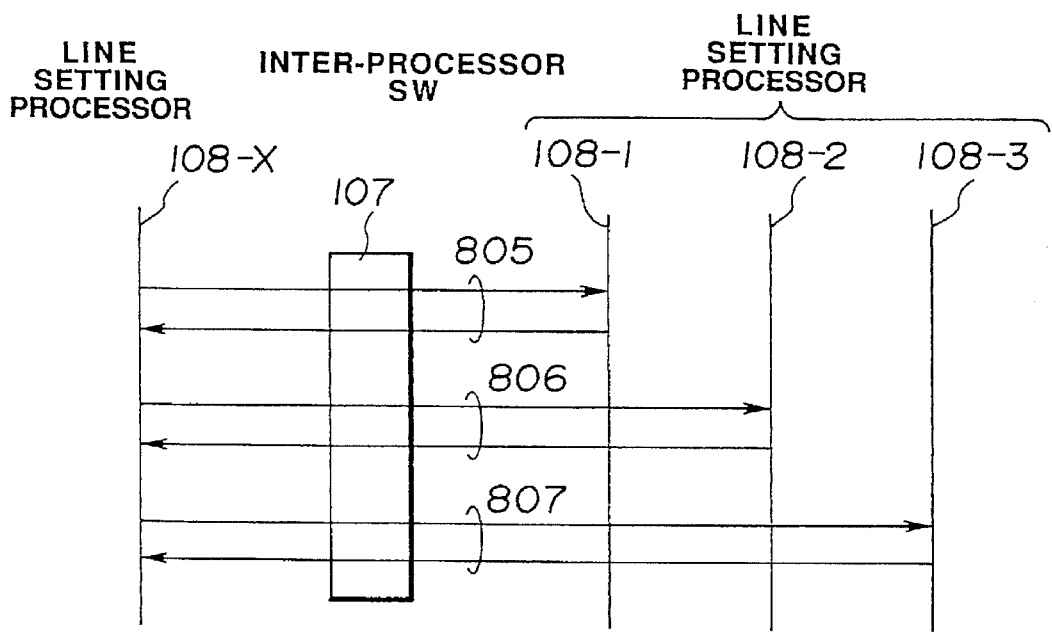
FIG. 8 is a sequence diagram for explaining a procedure of setting a signal link between the line setting processors.

Shown in FIG. 8 is a diagram for explaining how to set paths between the plurality of line setting processors necessary for data exchange between the signal outgoing/ incoming line processing processor 108 and the other line setting processors in a line setting operation to be described later. More specifically, FIG. 8 shows an example for explaining, when a line setting processor 108-x is newly added, how to set paths between the processor 108-x and the other processors 108-1, 108-2 and 108-3. The line setting processor 108-x, when receiving a data on the other processors from the line-setting-signal path management processor 109 as shown in FIG. 7, transmits cell signals 805, 806 and 807 to the respective line setting processors 108-1, 108-2 and 108-3 to demand the setting of these processors and the initial setting of the layer 2.

Figure 9:
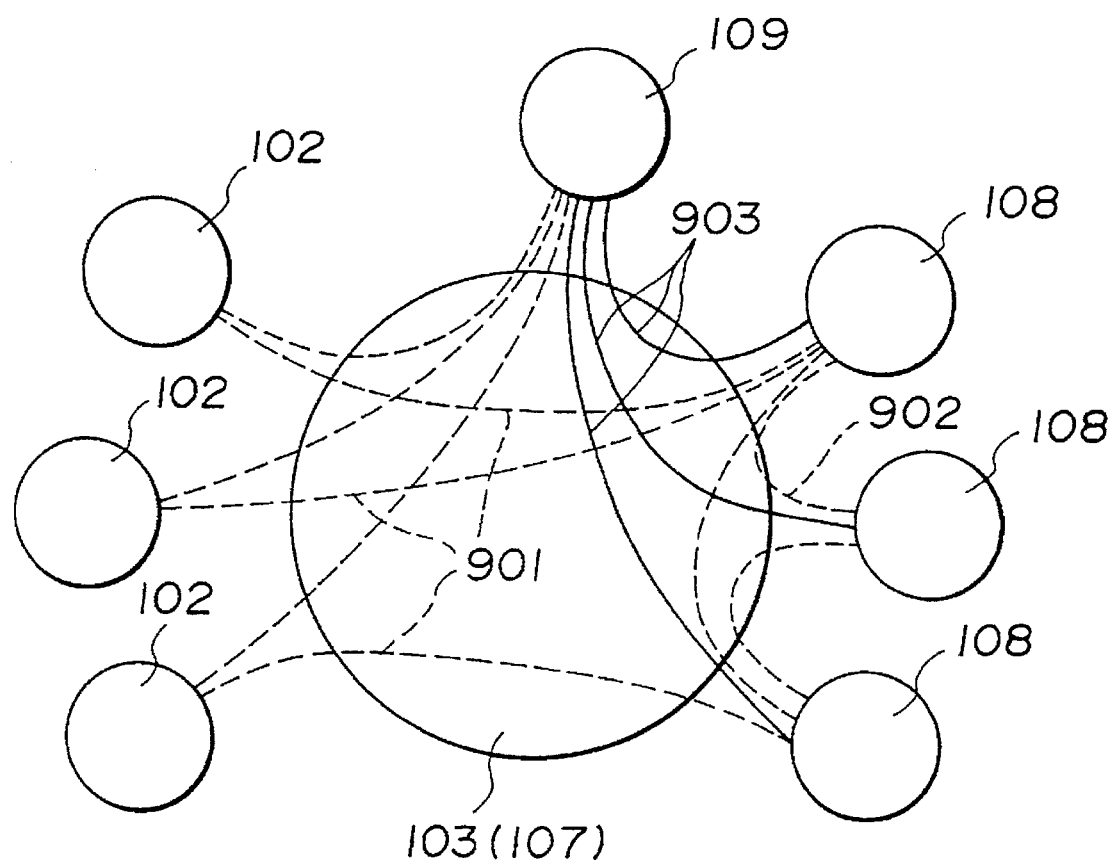
FIG. 9 is a diagram showing paths set between the lines and line setting processors, between the line setting processors and between the line setting processors and line-setting-signal path management processor.

FIG. 9 is a diagram showing how the paths are interconnected between the processors of the lines for signal transmission therebetween after the processing of FIG. 8 is completed. How to set the necessary signal paths will be seen from the drawing as already explained above. That is, paths 901, 902 and 903 are set between the line interfaces and line setting processors, between the line setting processors, and between the line setting processors and line-setting-signal path management processor, respectively.

Figure 10:
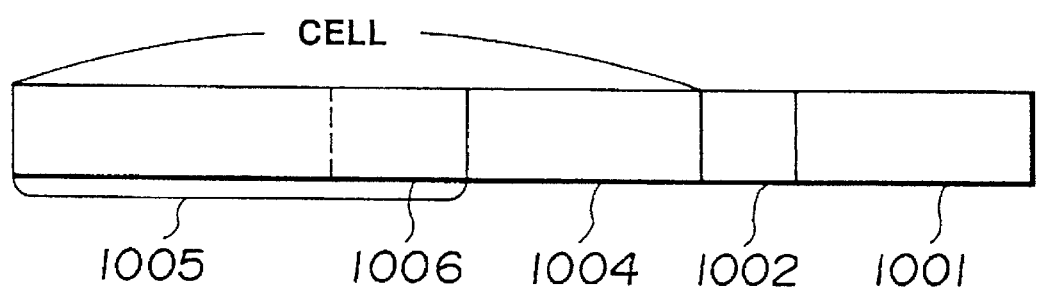
FIG. 10 is a diagram showing a format of a cell to be transmitted to a main switch.

Shown in FIG. 10 is a basic format of a cell flowing through the main switch 103, in which a routing tag 1001 is used to determine a route within the main switch 103. In the switch 103, the destination of the cell is determined by the value of the routing tag 1001 to transmit the cell to the destination. A within-system control signal identifier 1002 is used so that the line-setting-signal path management processor 109 sets a table showing a correlation between the channel and routing tag with respect to, for example, the line interface 102. An area 1004 indicates therein a logical channel. In the illustrated example, the area 1004 may be used differently depending on the value of the control signal identification of the within-system control signal identifier 1002. For example, when within-system control signal identifier 1002 indicates that the cell represents a control signal, the area 1004 indicates a value indicative of the line interface 102 as a caller. Since the value is fixedly determined at the time of forming the system, identification can be carried out between the line interface 102, line setting processor 108 and line-setting-signal path management processor 109. In the above example of the within-system control signal identifier 1002, the value of the line-setting-signal path management processor 109 of the caller is placed in the area 1004. When the within-system control signal identifier 1002 indicates that the cell is not a control signal, the area 1004 indicates the value of a logical channel at the destination. For example, when a line setting signal from a line is to be transmitted from the line interface 102 to the determined line setting processor 108, the value of the channel within the line setting processor specified when the corresponding line setting processor is determined is inserted in the area 1004 so that the incoming-side line setting processor can identify the outgoing-side line interface on the basis of the value of the area 1004. An area 1005 forms the body of the cell which consists of 48 bytes when the cell is based on the CCITT. Further, a control area 1006 forms a part of the area 1005 and is used to perform the function corresponding to the layer 2. In this example, it is assumed that the area 1005 is used according to the CCITT.

Figure 11:
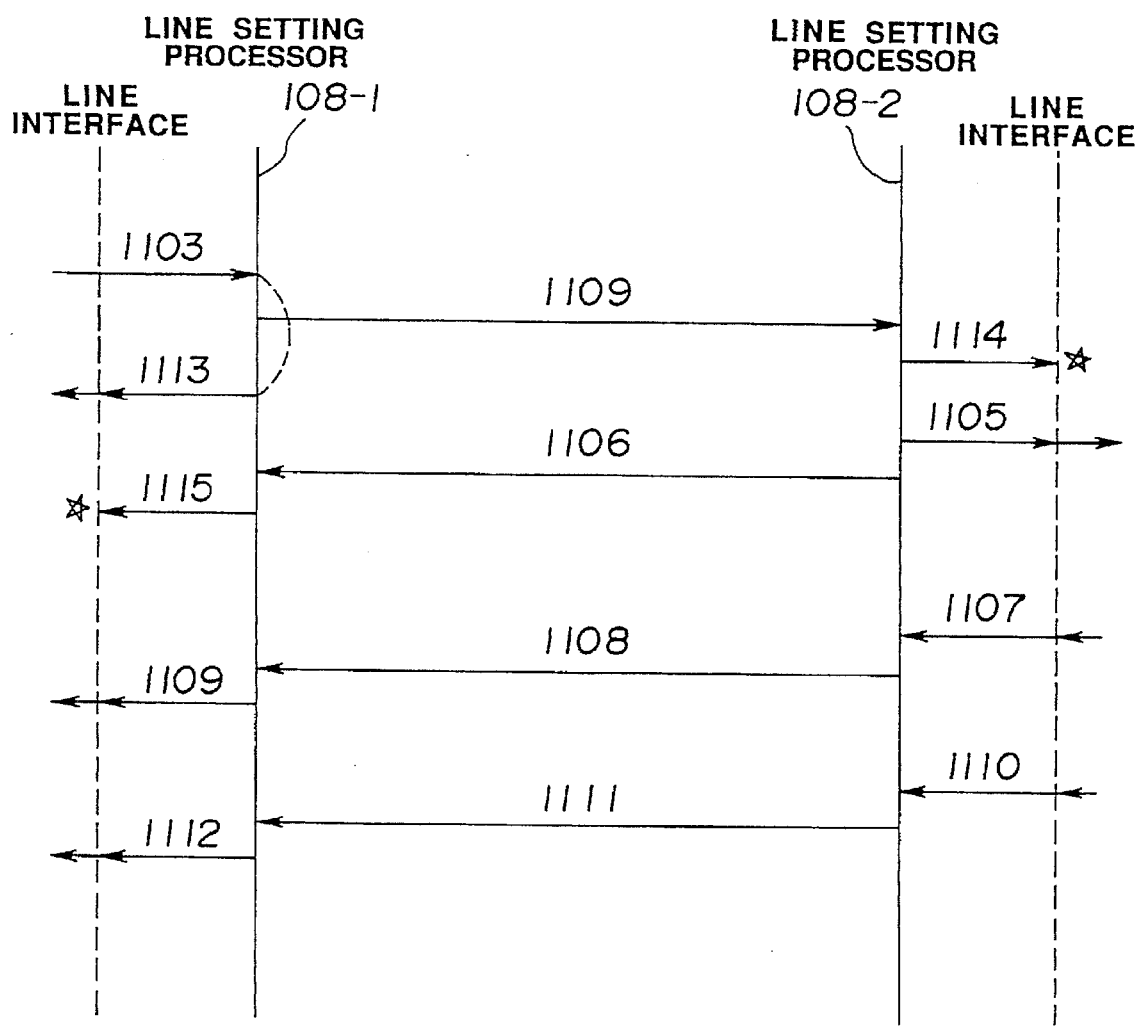
FIG. 11 is a sequence diagram for explaining the basic call setting sequence of the exchange control system of the present invention.

FIG. 11 is a diagram showing how to set a line in response to a line setting request generated from the line in the present exchange system, in which example a protocol corresponding to Q.931 recommended by the CCITT is employed as the line setting protocol. More specifically, a setup signal is transmitted from a terminal to the line interface 102 where the routing tag table 503 attaches the signal to a routing tag corresponding to the line setting processor 108-1 in charge of the corresponding line setting operation and a header data indicative of a corresponding signal channel within the line setting processor. The signal attached with the routing tag and header data is sent as a signal 1103 through the main switch 103 to the line setting processor 108-1. The line setting processor 108-1, when receiving the signal 1103, identifies the caller line on the basis of the signal channel of the received signal cell, analyzes the caller number on the basis of the layer 3 data, and determines the line setting processor 108 for line processing of the incoming-side line (selects the processor 108-2 in the illustrated example). The line setting processor 108-1 also seizes a logical channel which the user of the caller-side line is to use, and checks on the basis of the bearer attribute specified by the user whether or not the channel can be accommodated in the physical line to judge the request acceptable. The line setting processor 108-1, when determining that the request is acceptable, issues a signal 1113 to acknowledge the call acceptability and also issues an incoming-signal request 1104 to the incoming-side line setting processor 108-2. The signal 1104 contains the destination number, the outgoing-side within-line use logical channel and the bearer attribute.

The incoming-side processor 108-2 receives the signal 1104, determines the line position of the destination based on the number of the received signal, judges whether or not the request bearer can be accommodated in the corresponding line, and determines a logical channel to be used in the incoming-side line. At this stage, since the incoming side line setting processor 108-2 recognizes both the outgoing-side logical channel and the incoming-side logical channel, the processor 108-2 sends a within-system control signal 1114 (one cell) for setting a routing tag table in the incoming-side line interface. Independently of the above operation, the line setting processor 108-2 sends a signal 1105 indicative of an incoming signal to the corresponding terminal connected to the incoming-side line to inform the terminal of the logical channel to be used and bearer attribute.

The incoming-side processor 108-2 also sends a signal 1106 to the outgoing-side processor 108-1. The signal 1106 contains the number of a logical channel in a line to be used at the incoming side. In response to the signal 1106, the outgoing-side processor 108-1 sends a within-system control signal 1115 (one cell) for setting of the routing tag table. At this stage, the setting of the routing tag table is completed at the both outgoing and incoming sides, so that bi-directional cell data transmission can be realized.

Signals 1107, 1108 and 1109 are used to inform that the incoming-side terminal was put in its calling mode. Signals 1110, 1111 and 1112 are used to inform that the incoming-side terminal was put in its speech mode in response to the call. Through the above sequence, a communication between the outgoing and incoming terminals can be realized through the exchange system of the present invention.

Figure 12:
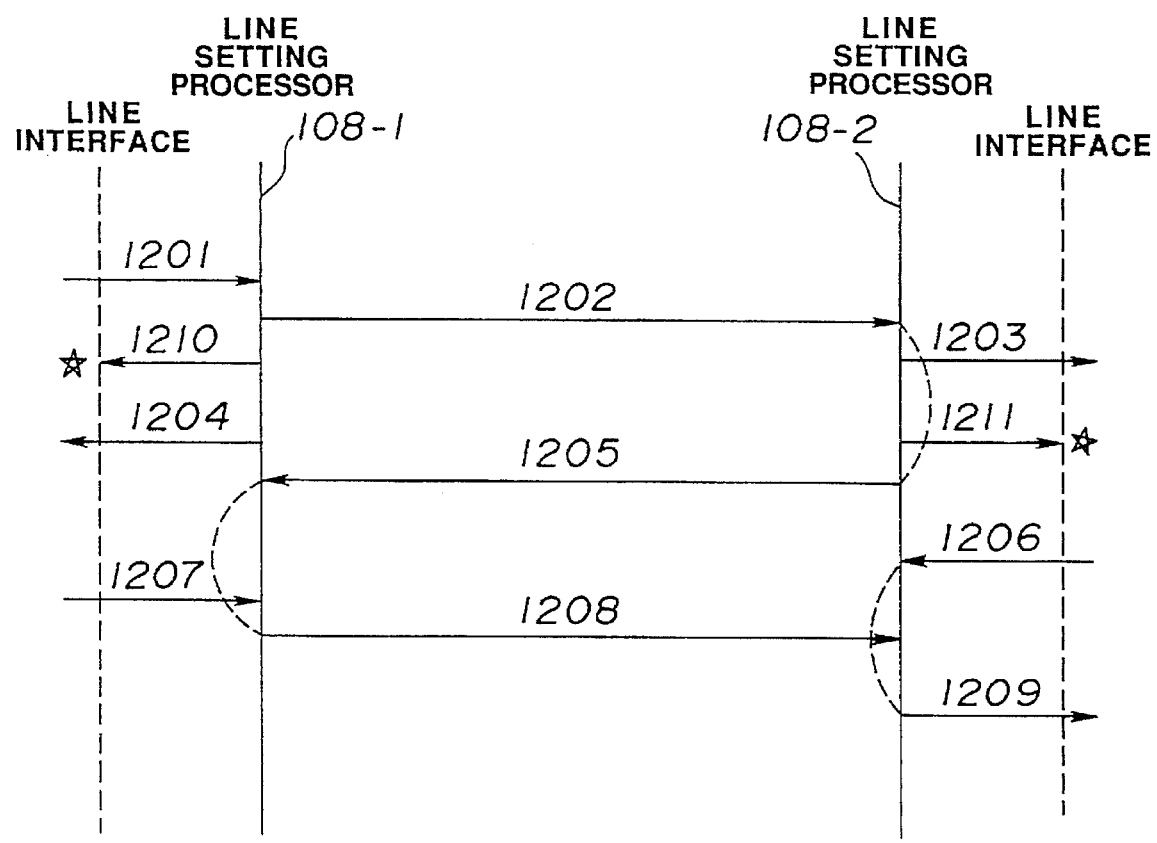
FIG. 12 is a sequence diagram showing the basic call releasing sequence of the exchange control system of the present invention.
Figure 13:
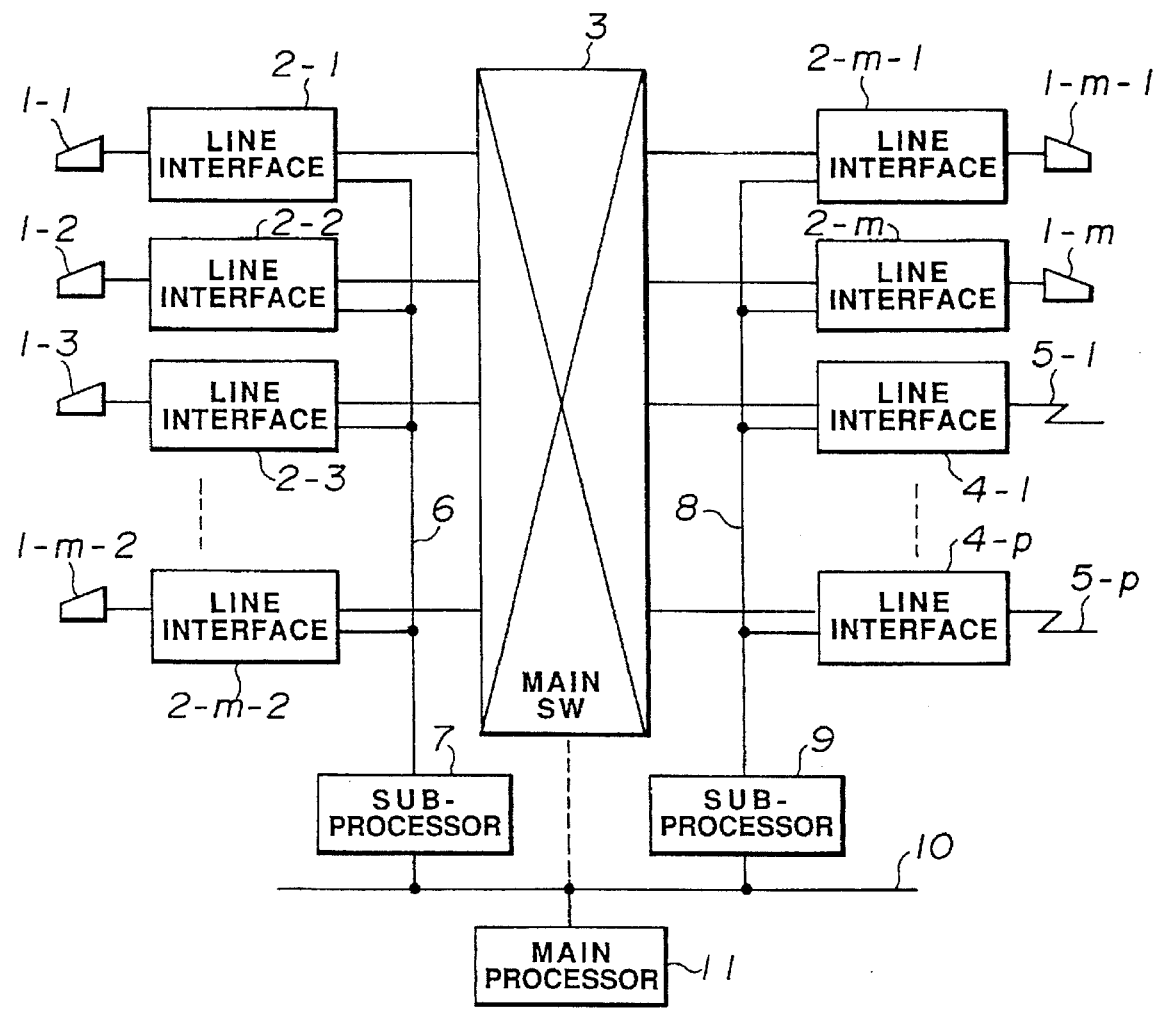
FIG. 13 is a block diagram of a conventional exchange control system.

FIG. 12 is a signal sequence diagram for explaining how to release the speech channel between the terminals set in FIG. 11. In more detail, a signal 1201 is generated from the line interface 102 to the line setting processor 108-1 to demand a speech-channel cut-off. The line setting processor 108-1, when receiving the signal 1201, sends a signal 1210 back to the line interface 102 to release the routing tag table set therein. That is, the line interface 102, when receiving the within-system control signal 1210, releases the table already set therein. The line setting processor 108-1 issues a release signal 1204 to the terminal connected to the line independently of the signal 1210. The processor 108-1 sends a release request signal 1202 to the party processor 108-2 to be connected. The line setting processor 108-2, when receiving the signal 1202, first sends to the associated line interface 102 a within-system control signal 1211 to release the routing tag table 503 set therein. The line interface 102, when receiving the signal 1211, releases the table 503 in the same manner as mentioned above. At the same time, the processor 108-2 sends a cut-off request signal 1203 to the terminal connected to the line.

The subsequent sequence is as shown in FIG. 12. That is, signals 1206, 1209, 1205, 1208, 1204 and 1207 are used as response signals, whereby all the physical and logical resources so far set at the time of the line setting are all released.

What is claimed is:

1. An exchange control system using a multiprocessor comprising:

a plurality of lines for transmitting user's data and line setting data for requesting line setting of at least one line capable of handling a plurality of calls at the same time;

a data exchange switch coupled to said plurality of lines;

a plurality of line setting processors for analyzing the line setting data transmitted through said one line and for executing a line setting operation to establish a data path through said data exchange switch, for coupling an originating line, from which a line setting request is generated, with a destination line to which the originating line is to be coupled based on the line setting data;

at least one line-setting-signal path management processor for selecting one of said plurality of line setting processors to associate the selected line setting processor with the one line that is suitable for executing the line setting operation therefor at least at a time when the one line enters a substantially activated state, and for allocating the line setting operation for the one line to the selected line setting processor during a period between the time when the one line enters the activated state and a time when the one line enters a substantially inactivated state; and inter-processor switch means for connecting said plurality of line setting processors to said line-setting-signal path management processor and for connecting said plurality of line setting processors and said line-setting-signal path management processor to said data exchange switch;

wherein said plurality of line setting processors and said line-setting-signal path management processor each include data exchange means for exchanging data through said inter-processor switch means.

2. An exchange control system using a multiprocessor as set forth in claim 1, wherein said line-setting-signal path management processor selects one of said plurality of line setting processors suitable for the line setting operation for the one line in reference to respective remaining processing capacities for said plurality of line setting processors at the time when the one line enters the activated state.

3. An exchange control system using a multiprocessor as set forth in claim 1, wherein each of said plurality of line setting processors comprises:

logical link setting means for setting a logical link to enable exchange of control data with said line-setting-signal path management processor at a time of initial setting of the exchange control system.

4. An exchange control system using a multiprocessor as set forth in claim 1, wherein each of said plurality of line setting processors comprises:

logical link setting means for setting a logical link to enable exchange of control data with said line-setting-signal path management processor at a time of installation to the exchange control system.

5. An exchange control system using a multiprocessor as set forth in claim 1, wherein:

said line-setting-signal path management processor includes first data base storing management data of a user to be transmitted to said plurality of lines, each of said plurality of line setting processors includes second data base storing management data for a user necessary for the line setting operation, said line-setting-signal path management processor retrieves, at the time of allocating the line setting operation to one of said plurality of line setting processors, the management data for the user necessary for the line setting operation from the first data base and transfers the retrieved management data to the line setting processor which executes the line setting operation, and said plurality of line setting processors store the transferred management data in the second data base, and retrieve the management data for a user necessary for the line setting operation from the second data base locally.

6. An exchange control system using a multiprocessor as set forth in claim 1, wherein the line setting operation is performed by exchanging control data between two line setting processors which perform respective line setting operations for the originating line and the destination line.

7. An exchange control system using a multiprocessor, comprising:

a plurality of lines for transmitting user's data and line setting data for requesting line setting of at least one line capapable of handling a plurality of calls at the same time;

a data exchange switch coupled to said plurality of lines;

a plurality of line setting processors for analyzing the line setting data transmitted through said one line and for executing a line setting operation to establish a data path through said data exchange switch, for coupling an originating line, from which a line setting request is generated, with a destination line to which the originating line is to be coupled based on the line setting data;

at least one line-setting-signal path management processor for selecting one of said plurality of line setting processors to associate the selected line setting processor with the one line that is suitable for executing the line setting operation therefor at least at a time when the one line enters a substantially activated state, and for a allocating the line setting operation for the one line to the selected line setting processor during a period between the time when the one line enters the activated state and a time when the one line enters a substantially inactivated state; said line-setting-signal path management processor including:

an integrated-service controller for integratedly performing management and updating of data concerning the line setting operation; and broadcasting means for broadcasting, when the data concerning the line setting operation is changed, the data concerning the line setting operation managed by the integrated-service controller to all of said plurality of line setting processors;

wherein each of said plurality of line setting processors further includes;

means for inquiring of said integrated-service controller about a line setting processor to be selected when the destination line cannot be determined uniquely in the line setting operation.

8. An exchange control system using a multiprocessor as set forth in claim 7, wherein said line-setting-signal path management processor selects one of said plurality of line setting processors suitable for the line setting operation for the one line in reference to respective remaining processing capabilities for said plurality of line setting processors at the time when the one line enters the activated state.

9. An exchange control system using a multiprocessor as set forth in claim 7, wherein each of said plurality of line setting processors comprises:

logical link setting means for setting a logical link to enable exchange of control data with said line-line-setting signal path management processor at a time of initial setting of the exchange control system.

10. An exchange control system using a multiprocessor as set forth in claim 7, wherein each of said plurality of line setting processors comprises:

logical link setting means for setting a logical link to enable exchange of control data with said line-setting-signal path management processor at a time of installation to the exchange control system.

11. An exchange control system using a multiprocessor as set forth in claim 7, wherein:

said line-setting-signal path management processor includes first data base storing management data of a user to be transmitted to said plurality of lines, each of said plurality of line setting processors includes second data base storing management data for a user necessary for the line setting operation, said line-setting-signal path management processor retrieves, at a time of allocating the line setting operation to one of said plurality of line setting processors, the management data for the user necessary for the line setting operation from the first data base and transfers the retrieved management data to the line setting processor which executes the line setting operation, and said plurality of line setting processors store the transferred management data in the second data base, and retrieve the management data for a user necessary for the line setting operation from the second data base locally.

12. An exchange control system using a multiprocessor as set forth in claim 7, wherein the line setting operation is performed by exchanging control data between two line setting processors which perform respective line setting operations for the originating line and the destination line.

13. A switching system comprising:

a plurality of lines for transmitting user's data and line setting data for requesting line setting, at lease one line of the plurality of lines having a plurality of logical channels to permit a plurality of calls therethrough at the same time;

an exchange switch coupled to said plurality of lines;

a plurality of line setting processors coupled to said exchange switch for analyzing the line setting data transmitted through said one line and for executing a line setting operation to establish a data path for a call between an originating line from which a line setting request is generated and a destination line to which the originating line is to be coupled based on the line setting data; and a management processor for selecting one of said plurality of line setting processors to associate the selected line setting processor with the one line that is suitable for executing the line setting operation therefor at least at a time when the one line enters a substantially activated state, and for assigning the line setting operation of any calls on the one line to the selected line setting processor during a period between the time when the one line enters the activated state and the time when the one line enters a substantially inactivated state, said management processor including:

an integrated-service controller for integratedly performing management and updating of data concerning the line setting operation; and broadcasting means for broadcasting, when the data concerning the line setting operation is changed, the data concerning the line setting operation managed by the integrated-service controller to all of said plurality of line setting processors;

wherein each of said plurality of line setting processors further includes;

means for inquiring of said integrated-service controller about a line setting processor to be selected when the destination line cannot be determined uniquely in the line setting operation.

14. A switching system as set forth in claim 13, wherein each of said plurality of lines comprises line interfaces respectively, each of said line interfaces including look-up table means for storing fixed tag data representing an association of the one line with said associated line setting processor.

* * * * *

UNITED STATES PATENT AND TRADEMARK OFFICE
CERTIFICATE OF CORRECTION

PATENT NO. : 5,657,449
DATED : August 12, 1997
INVENTOR(S) : Yoshiro Osaki

It is certified that error appears in the above-indentified patent and that said Letters Patent is hereby corrected as shown below:

Claim 7, Column 14, Line 42, "capapable" should read --capable--;

Claim 7, Column 14, Line 58, after "and for", delete --a--;

Claim 9, Column 15, Lines 23-24, "line-line-setting signal" should read --line-setting-signal--;

Claim 13, Column 16, Line 8, "lease" should read --least--;

Signed and Sealed this

Twenty-fourth Day of February, 1998

Attest:

BRUCE LEHMAN

*Attesting Officer*     *Commissioner of Patents and Trademarks*